United States Patent [19]

Schucker et al.

[11] 3,886,080
[45] May 27, 1975

[54] CHELATING AGENTS COUPLED TO INORGANIC CARRIERS AND METHOD OF PREPARING

[75] Inventors: Gerald D. Schucker, Corning; Ken F. Sugarvara, Painted Post; Howard H. Weetoll, Elmira, all of N.Y.

[73] Assignee: Corning Glass Works, Corning, N.Y.

[22] Filed: Sept. 4, 1973

[21] Appl. No.: 394,119

Related U.S. Application Data

[62] Division of Ser. No. 227,204, Feb. 17, 1972, abandoned.

[52] U.S. Cl. .......... 252/176; 252/179; 252/DIG. 11; 260/2.2; 195/63
[51] Int. Cl. ............................................. C02b 1/00
[58] Field of Search ................... ....... 252/1, 176, 252/179, DIG. 11; 260/2.2; 195/63

[56] References Cited
UNITED STATES PATENTS 3,484,390  12/1969  Bauman et al. ...................... 260/2.2
3,519,538   7/1970  Messing et al. ...................... 195/63

*Primary Examiner*—Stephen J. Lechert, Jr.
*Attorney, Agent, or Firm*—James A. Giblin; Clinton S. Janes, Jr.; Clarence R. Patty, Jr.

[57] ABSTRACT

Reusable composite comprising a chelating agent chemically coupled to an essentially insoluble inorganic carrier by means of an intermediate silane coupling agent. The chelating agent is bonded to the silane coupling agent by means of an azo linkage. Methods of preparing and using the composite are disclosed.

4 Claims, 2 Drawing Figures

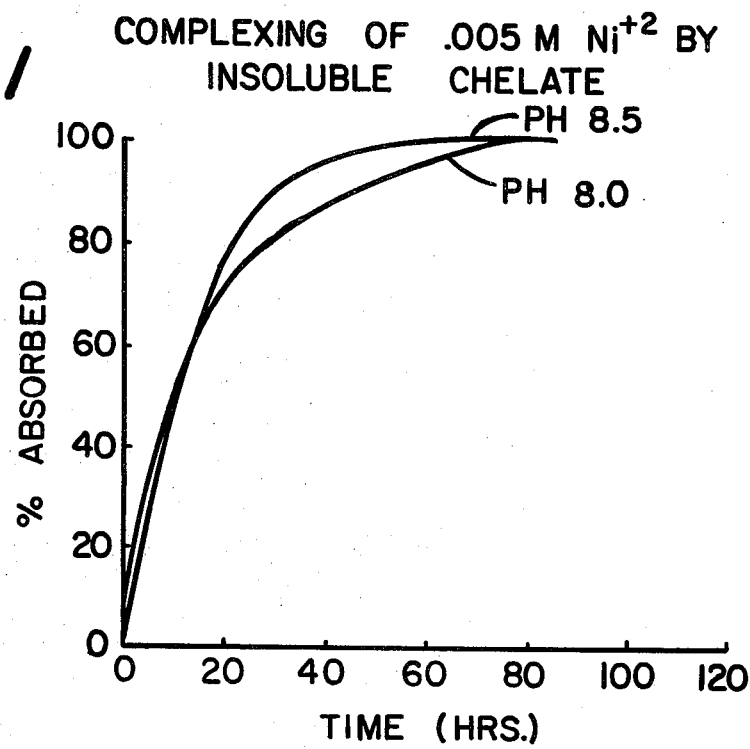
Fig. 1 COMPLEXING OF .005 M $Ni^{+2}$ BY INSOLUBLE CHELATE
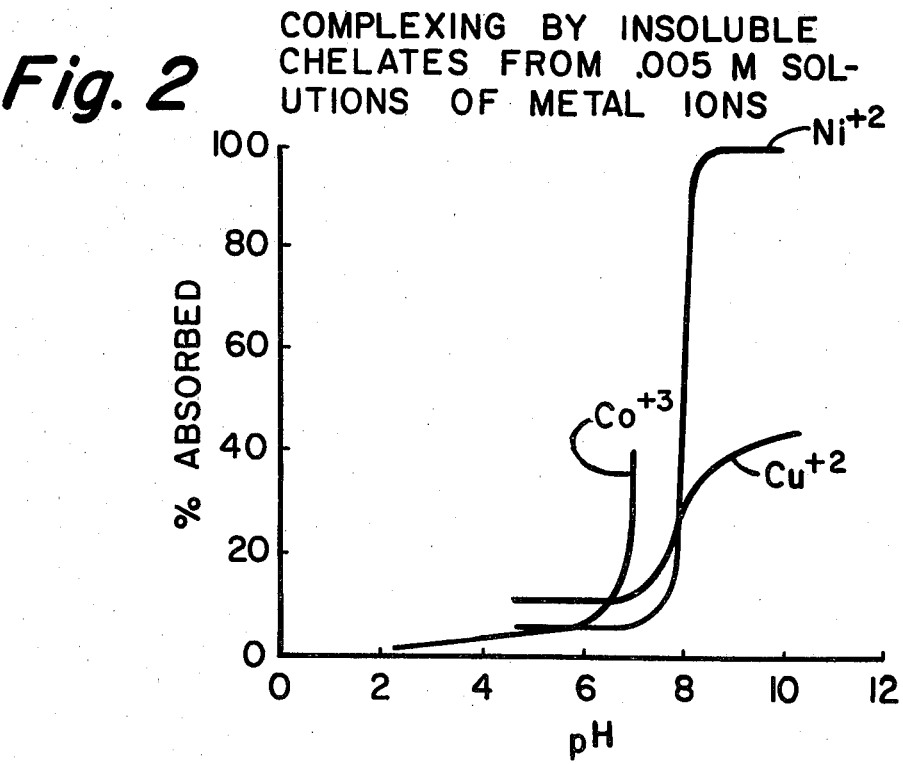
Fig. 2 COMPLEXING BY INSOLUBLE CHELATES FROM .005 M SOLUTIONS OF METAL IONS

CHELATING AGENTS COUPLED TO INORGANIC CARRIERS AND METHOD OF PREPARING

This is a division of application Ser. No. 227,204, filed Feb. 17, 1972, and now abandoned.

BACKGROUND OF THE INVENTION

1. Field of the Invention

This invention relates to immobilized or insolubilized chelating agents and methods for preparing and using them. More specifically, the invention relates to chelating agents which have been rendered immobile or insoluble by chemical coupling to inorganic carriers by means of an intermediate silane coupling agent. The resulting composites are re-usable and highly durable.

Chelating agents are compounds which can complex with various ions. Typically, a chelate is characterized by having a cyclic structure usually containing five or six atoms in a ring to which a metallic ion (such as Cu, Fe, and the like) can be held in place by one or more groups. Among the many known chelating compounds are chlorophyl, which complexes with a magnesium ion and hemoglobin, which complexes with an iron ion. Chelates which complex with a wide variety of metal ions are known. These chelates can complex with, for example, the ions of aluminum, arsenic, bismuth, cadmium, cerium, chromium, cobalt, copper, gallium, germanium, gold, indium, iron, lead, magnesium, manganese, molybdenum, nickel, niobium, palladium, platinum, potassium, silver, sodium, tellurium, thallium, thorium, tin, titanium, tungsten, uranium, vanadium, zinc, and zirconium.

Chelates are useful in many applications, especially in analytical chemistry. Since the chelates are capable of complexing with specific metallic ions in solution, they are used qualitatively to indicate the presence of ions which may form a characteristic complex color, or quantitatively to measure the concentration of various ions in very dilute solutions. Because chelates can complex with ions of very low concentrations, their use is of particular significance in any application where the detection, isolation, or removal of particular ions at relatively low concentrations is desired, e.g., chemistry, biochemistry, pharmacology, toxicology, geochemistry, water pollution monitoring, the preparation of ultra pure water, and the like. The growing recognition that chelates can be used for numerous analytical procedures has led to the development of various methods for modifying the chelates so that they can be utilized more effectively and more economically. Among the developments which have enhanced the utility and value of chelating agents are methods for providing so-called chelating resins and the chemical coupling of various chelating agents to organic carriers.

2. Prior Art

Ion-exchange resins have been known and used for some time. Typically, these resins separate cations from solution by means of chemi-sorption. More properly, they can be designated as ion-exchangers since they promote cation separation by ion-exchange means rather than actual chelation. Thus, the cation bond to these resins is relatively weak and these resins are not true chelating resins. Chelating resins are also well known. However, they have the disadvantage in being commonly limited to chelation of cations having a valence of plus 2. These shortcomings have led to the development of methods of attaching a greater variety of chelating agents to organic carriers by covalent bonds.

In U.S. Pat. No. 3,484,390, there are disclosed chelating composites formed by chemically coupling various chelates to diazotized organic carriers, such as diazotizable cellulose derivatives, polystyrene, and the like. The chelate composites were disclosed as quantitatively recovering silver, copper, and gold. Further, it was disclosed that the composites could be intermittently regenerated by treatment with acid or base washes. The main requirement for the organic carriers of the above disclosure is that they have chemical groups which, either alone or through modification, are capable of being diazotized. Once diazotized, the carriers are chemically coupled to appropriate chelates by means of azo linkage.

The use of the disclosed organic carriers to immobilize the chelates has been found to have several disadvantages in practical chelating applications. The main disadvantages stem from the fact that the disclosed carriers are organic materials. Being organic, the carriers, especially the cellulose carriers, are subject to microbial attack owing to the presence of carbon atoms in the polymer chain. Microbial attack of the carrier tends to release the chelate. Further, the composites having organic carriers have limited utility in columns or other containers because of their tendency to swell or shrink with changing conditions of pH. This swelling or shrinking adversely affects the controlability of flow rates. The organic carriers also tend to lack the dimensional stability desired in flow through operations since they may compress at higher flow rates, thus limiting their chelating property at the higher flow rates. Further, it has been found that the surface area to which the chelating agents are attached can vary significantly depending on pH, the materials used, and other conditions. This makes it difficult, without added experimentation, to prepare chelate composites having a known amount of attached chelate which can complex with a given amount of ion before regeneration of the composite is necessary. Lastly, many organic carriers used in chelating composites cannot be sterilized by such means as an autoclave without damage or degradation, and this, in turn, limits applications in certain biological areas where sterilization is desirable or required, e.g., if chelate composites were used to remove poisonous metal ions from a blood stream, the composites would have to be sterile.

The above disadvantages associated with organic carriers are similar to disadvantages that have been associated with using organic carriers to chemically couple such entities as enzymes, antibodies, antigens, and other substances which, when immobilized or insolubilized by attachment to an insoluble carrier, must retain their specific biological or chemical activities. Recently, it has been found that the above disadvantages can be overcome by using inorganic carriers to which enzymes, antigens, and antibodies can be chemically coupled via an intermediate silane coupling agent to form immobilized or insolubilized composites having specific activities. The use of inorganic carriers avoids many of the disadvantages associated with organic carriers noted in past work with enzymes and other biologically active materials. In U.S. Pat. No. 3,519,538, U.S. Ser. No. 855,376 now U.S. Pat. No. 3,652,761 and U.S. Ser. No. 167,770, assigned to the same assignee as the present invention, there are disclosed methods for chemically coupling enzymes, antigen-antibodies, and coenzymes, respectively, to inorganic carriers. Those disclosures provided a significant advance in their respective arts in that they teach methods for chemically coupling biologically active organic materials to an inorganic substrate with the effect of immobilizing or insolubilizing the attached materials.

It has now been found that chelating agents can also be immobilized or insolubilized by chemical coupling to inorganic carriers in such a manner that they retain their capacity to complex with specific metallic ions.

SUMMARY OF THE INVENTION

We have found that a wide variety of chelating agents can be chemically coupled to inorganic carriers through an intermediate silane coupling agent to provide a chelating composite which overcomes the disadvantages associated with using organic carriers. Our composite comprises an inorganic carrier chemically coupled to a chelating agent by means of an intermediate silane coupling agent having a silicon portion and an organic portion wherein the coupling agent is attached to the carrier by means of the silicon portion and attached to the chelating agent through an azo linkage by means of the organic portion of the silane coupling agent. The composites can be used to remove a wide variety of metal ions from a solution and, after elution of the metal, the composites can be reused.

BRIEF DESCRIPTION OF THE FIGURES

FIG. 1 represents the percent complexation of nickel from dilute solution as a function of time for two values of pH.

FIG. 2 represents the effect of variations in pH upon the affinity of the immobilized chelates for various metal ions in dilute solutions.

SPECIFIC EMBODIMENTS

The inorganic carriers that may be used in the present invention include those disclosed in U.S. Pat. No. 3,519,538 and those carriers are incorporated herein by reference. The main requirement for the inorganic carriers are that they be essentially water insoluble and that they have surface oxide or hydroxyl groups capable of bonding to the silicon portion of the silane coupling agents. Examples of such carriers are silica, silica gels, glass, bentonite, hydroxyapatite, alumina, and nickel oxide. Other examples may be found in the above patent. Our preferred inorganic carrier is granular porous glass having a known average pore size, known mesh, and a known surface area. By using a porous inorganic carrier, a large surface area is available for the coupling procedure. Since even porous glass has a limited solubility in water, the glass may be treated with a coating agent, prior to silanization, to enhance its durability in an aqueous environment. The coating that may be used is preferably an oxide of zirconium or titanium. Such a coating can be applied by covering the surface of the carrier with an organo-metallic solution or a metal salt solution, and then firing the coated carrier at an elevated temperature (e.g., 200°–800°C.) for about one hour to impart a thin, continuous layer of metal oxide on the carrier surface. Specific directions for preparing such a carrier can be found in the co-pending patent application, filed with this disclosure, and in the names of W. Tomb and H. Weetall, entitled "Improved Enzyme Carriers", now U.S. Pat. No. 3,783,101.

The intermediate silane coupling agents that can be used in preparing the composites of the present invention include many of the silane coupling agents disclosed in U.S. Pat. No. 3,519,538. The only requirement for the silane coupling agents is that they are capable, alone or through modification of their organic portions, of being diazotized when coupled via their silicon portion to the inorganic carriers.

The diazotized silanized carriers are then contacted with a solution of the chelating agent to be chemically coupled to form an azo linkage between the chelating agent and the organic portion silanized inorganic carrier.

The chelating agents which can be chemically coupled to form the composites of the present invention include those chelates which are capable of forming an azo linkage to the silane coupling agent while retaining their capacity to complex with metal ions. Among the chelating agents which can be thus coupled are 8-hydroxyquinoline (commonly known as oxine) dithizone, neocuproine, O-phenanthroline, salicylaldoxime, N-benzoyl-N-phenylhydroxylamine, rhodamine B, thenoyltrifluoroacetone, and benzoinoxime, and the like. As can be appreciated, the above compounds all share the feature of having an unsaturated ring structure.

Visual inspection of the prepared chelate composites indicated that the colors or shades of the composites varied depending on the particular chelating agent used. Since the reactions involved in the preparation of the composites occur only as a monolayer at the surface of the carrier, the physical properties of the carrier such as surface area, pore diameter, mesh size, and pore volume are significant factors in their preparation. Our preferred carrier, except as otherwise indicated, consisted of porous 96% silica glass particles. In the experiments below, porous glass of about 40–80 mesh U.S. Sieve particle size, and about 550A average pore diameter were used. Such porous glass or glass of a similar type, can be made in accordance with the teachings of U.S. Pat. No. 2,106,764, issued to Hood et al., U.S. Pat. No. 3,485,687, issued to Chapman, and U.S. Pat. No. 3,549,524, issued to Haller. These glasses are commonly referred to as controlled pore glass or simply, CPG.

The reaction of the silane coupling agent with the surface of the inorganic carrier yields a composite which may generally be represented as inorganic carrier-silane-chelate.

Samples of various chelates chemically coupled to porous glass particles were prepared according to Examples 1–5 below. Representative composites were then used to complex with the specific ions indicated in Tables I–X below. Further studies were then made in Examples 6 and 7 to determine the effects of time and pH on the percent complexation of various metal ions.

EXAMPLE 1

Preparation of Chemically Coupled
8-Hydroxyquinoline (oxine)

A sample of 10 g. porous 96% silica glass particles, 40–80 mesh particle size, 550A pore diameter, was refluxed in 100 ml. toluene containing 10% (v/v) γ-aminopropyltriethoxysilane for 19 hours. The product was washed with toluene. The product was then refluxed in 100 ml. of chloroform containing 5 ml. triethylamine and 1 g. p-nitrobenzoylchloride for 18 hours. The product was then washed with chloroform and air dried.

The nitro groups on the derivative were reduced by boiling 30 minutes in 100 ml. of water containing 5 g. sodium dithionite. The final product was diazotized in cold 2 HCl by the addition of 1 g. $NaNO_2$. The diazotitation was continued for about 30 minutes after which the diazotized carrier was washed with cold water. The chelate was coupled by adding the diazotized glass to 200 mg. of the chelate 8-hydroxyquinoline in about 20 ml. of 0.1 M $Na_2CO_3$ solution. The reaction was completed in an ice bath and allowed to continue for 24 hours at 0°–6°C.

The chelate-glass derivative was washed successively in $Na_2CO_3$ solution, dilute HCl, distilled $H_2O$, and then acetone dried. The resulting composite is represented below as CPG-O.

EXAMPLE 2

Preparation of Chemically Coupled Dithizone

Diazotized porous glass, prepared as in Example 1, was added to 200 mg. of the chelate dithizone in about 20 ml. of 0.1 M $Na_2CO_3$ solution. The reaction was carried out in an ice bath and allowed to continue 24 hours at 0°–6°C.

The chelate-glass derivative was also successively washed in $Na_2CO_3$ solution, dilute HCl, distilled $H_2O$, and acetone dried.

EXAMPLE 3

Preparation of Chemically Coupled Neocuproine

This composite was prepared in the same manner as the composites of the above example but with 200 mg. of neocuproine in the 0.1 M $Na_2CO_3$ solution instead of the chelates of Examples 1–2.

EXAMPLE 4

Preparation of Chemically Coupled O-Phenanthroline

The same procedures as above were used with the chelate being 200 mg. of O-phenanthroline in the 0.1 M $Na_2CO_3$ solution.

EXAMPLE 5

Preparation of Chemically Coupled Salicylaldoxime

The same procedures as above were used to prepare this composite but 200 mg. of salicylaldoxime in the 0.1 M $Na_2CO_3$ solution was used.

Applications of Insolubilized 8-Hydroxyquinoline To Removal of Trace Metals for Solution The studies of the porous glass-oxine material (CPG-O) are summarized by Tables I–VII. In this study, microgram levels (e.g., 200–400 mg.) of various common elements were shaken with the CPG-O for one hour in a separatory funnel at the specified pH values. The pH was maintained between 2.0 and 7.0. Adjustments were made by using a pH meter and stabilizing the pH with ammonium acetate-acetic acid buffer solutions. Degradation in very acid or basic solutions occurred as evidenced by discoloration of the solution and the presence of tiny particles of colorless porous glass. The tables are self-explanatory. Column 1 represents micrograms of specified element reacted with 0.5 gram of CPG-O. Column 2 shows the weight of metal complexed complexation at the corresponding pH of column 4. Column 5 indicates if a complexing agent was used. In all cases, spectrophotometric procedures were used to analyze the aqueous solution after the extraction or complexing step.

Table I

Complexing of Iron by Porous Glass-Oxine (CPG-O)

| Weight ($\mu g$) | Weight Adsorbed ($\mu g$) | Percent Adsorbed | pH | Complexing Agent |
|---|---|---|---|---|
| 102 | 15 | 15 | 2.0 | none |
| 102 | 29 | 28 | 3.0 | none |
| 102 | 102 | 100 | 4.0 | none |
| 102 | 102 | 100 | 5.0 | none |
| 102 | 102 | 100 | 6.0 | none |
| 102 | 67 | 66 | 3.0 | tartaric |
| 102 | 84 | 82 | 4.0 | tartaric |
| 102 | 96 | 94 | 5.0 | tartaric |
| 102 | 102 | 100 | 6.0 | tartaric |

Table II

Complexing of Molybdenum by Porous Glass-Oxine (CPG-O)

| Weight ($\mu g$) | Weight Adsorbed ($\mu g$) | Percent Adsorbed | pH | Complexing Agent |
|---|---|---|---|---|
| 212 | 212 | 100 | 2.0 | none |
| 212 | 212 | 100 | 4.0 | none |
| 212 | 207 | 98 | 5.0 | none |
| 212 | 112 | 53 | 6.0 | none |
| 212 | 72 | 34 | 7.0 | none |

Table III

Complexing of Copper by Porous Glass-Oxine (CPG-O)

| Weight ($\mu g$) | Weight Adsorbed ($\mu g$) | Percent Adsorbed | pH | Complexing Agent |
|---|---|---|---|---|
| 391 | 211 | 53 | 2.0 | none |
| 391 | 341 | 87 | 3.0 | none |
| 391 | complete | 100 | 4.0 | none |
| 391 | complete | 100 | 5.0 | none |
| 391 | complete | 100 | 6.0 | none |
| 391 | complete | 100 | 7.0 | none |

Table IV

Complexing of Zirconium by Porous Glass-Oxine (CPG-O)

| Weight ($\mu g$) | Weight Adsorbed ($\mu g$) | Percent Adsorbed | pH | Complexing Agent |
|---|---|---|---|---|
| 135 | 104 | 77 | 2.0 | none |
| 135 | 107 | 79 | 3.0 | none |
| 135 | 131 | 97 | 4.0 | none |
| 135 | 135 | 100 | 6.0 | none |
| 135 | 79 | 58 | 2.0 | tartaric acid |
| 135 | 81 | 60 | 3.0 | tartaric acid |
| 135 | 78 | 58 | 4.0 | tartaric acid |
| 135 | 90 | 67 | 6.0 | tartaric acid |

Table V

Complexing of Vanadium by Porous Glass-Oxine (CPG-O)

| Weight ($\mu g$) | Weight Adsorbed ($\mu g$) | Percent Adsorbed | pH | Complexing Agent |
|---|---|---|---|---|
| 200 | 160 | 80 | 2.0 | none |
| 200 | 200 | 100 | 4.0 | none |
| 200 | 200 | 100 | 6.0 | none |
| 200 | 200 | 100 | 7.0 | none |

Table VI

Complexing of Tungsten by Porous Glass-Oxine (CPG-O)

| Weight (μg) | Weight Adsorbed (μg) | Percent Adsorbed | pH | Complexing Agent |
|---|---|---|---|---|
| 250 | 250 | 100 | 2.0 | none |
| 250 | 250 | 100 | 4.0 | none |
| 250 | 165 | 66 | 6.0 | none |
| 250 | 75 | 30 | 7.0 | none |

Table VII

Complexing of Titanium by Porous Glass-Oxine (CPG-O)

| Weight (μg) | Weight Adsorbed (μg) | Percent Adsorbed | pH | Complexing Agent |
|---|---|---|---|---|
| 153 | 0 | 0 | 2.0 | none |
| 153 | 137 | 90 | 3.0 | none |
| 153 | 141 | 92 | 4.0 | none |
| 153 | 141 | 92 | 5.0 | none |
| 153 | 110 | 72 | 6.0 | none |
| 153 | 36 | 24 | 7.0 | tartaric acid |
| 153 | 69 | 45 | 7.0 | citric acid |
| 153 | hydrolyzed | | 7.0 | none |

Application of Other Immobilized Chelates To Remove Trace Metals from Solution Other immobilized chelating composites were used in a similar manner to complex with the ions indicated in Tables VIII–X below.

Table VIII

Complexing of Iron by Controlled Pore Glass-O-Phenanthroline

| Weight (μg) | Weight Adsorbed (μg) | Percent Adsorbed | pH |
|---|---|---|---|
| 102 | 43 | 42 | 2.0 |
| 102 | 23 | 22 | 3.0 |
| 102 | 28 | 27 | 4.0 |

Table IX

Complexing of Copper by Controlled Pore Glass-Salicylaldoxime

| Weight (μg) | Weight Adsorbed (μg) | Percent Adsorbed | pH |
|---|---|---|---|
| 391 | 154 | 39 | 2.0 |
| 391 | 241 | 62 | 3.0 |
| 391 | 339 | 87 | 4.0 |
| 391 | 378 | 97 | 5.0 |
| 391 | 378 | 97 | 6.0 |
| 391 | 378 | 97 | 7.0 |

Table X

Complexing of Copper by Controlled Pore Glass-Neocuproine

| Weight (μg) | Weight Adsorbed (μg) | Percent Adsorbed | pH |
|---|---|---|---|
| 391 | 139 | 36 | 2.0 |
| 391 | 173 | 44 | 3.0 |
| 391 | 176 | 45 | 4.0 |
| 391 | 200 | 51 | 5.0 |
| 391 | 243 | 62 | 6.0 |
| 391 | 262 | 67 | 7.0 |
| 391 | 294 | 75 | 7.5 |

Semi-Micro Studies

Batch distribution studies were carried out in the semi-micro concentration range using the porous glass-oxine (CPG-O) to determine the variation in uptake of metal ions with time and pH. In these studies the ratio of metal ion to the CPG-O was in the order of about 500–1,000 times greater than the preceeding studies.

EXAMPLE 6

One gram quantities of the CPG-O were added to 50 ml. volumes of an ammonia-buffered solution of 0.005 M nickel. At the pH values used (8.0 and 8.5), the nickel ions were held in solution as the ammonia complex. After equilibrating for various time periods the amount of metal ion remaining in the aqueous phase was determined by EDTA titration. Knowing the total amount of metal initially added, the quantity taken up by the CPG-O could be calculated. FIG. 1 presents the complexation of nickel from dilute solution by the CPG-O (or carrier-silane-oxine complex) as a function of time for two values of pH. The rate is initially fairly rapid, about 50% of the metal being taken up during the first ten hours. However, an additional 60 hours was required for complete complexation. The rate does not appear to vary significantly with small changes in pH.

EXAMPLE 7

The effect of variations in pH upon the affinity of the CPG-O for various metal ions in dilute solutions is presented in FIG. 2. One gram quantities of the CPG-O were equilibrated for 72 hours with 50 ml. volumes of solutions of 0.005 M metal ions and buffered to various pH levels. EDTA titration was used to determine the distribution of the metal ions between the complex and aqueous phases. In preparing the solutions for these batch equilibrium studies it was necessary to add ammonia or tartrate to maintain the ions in solution. It should be noted that the presence of these complexes doubtless affects the completion of the metals by the CPG-O.

In the higher pH ranges, nickel and cobalt were complexed with ammonia and copper with tartrate. Cobalt could not be held in solution above pH 7. In the case of nickel, transfer of the metal from the ammonia complex to the immobilized chelate apparently occurred to a greater extent than with the cobalt ammonia or copper tartrate complexes.

From the above tables I–X it can be seen that one of the more significant features of the composites lies in their capability for extracting various cations from solutions in a manner somewhat analogous to their counterparts in solvent extraction. However, it should be noted that the actual mechanism by which the ions are extracted from solution is probably different than that which would be expected in classical chelation. For example, in using a soluble (or mobile) chelating agent such as 8-hydroxyquinoline (oxine) to chelate $Ni^{++}$, the following complex would be expected:

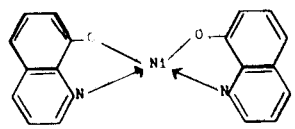

This may be simply represented as $NiQ_2$, where Q is the oxine. Similarly, the structure for the complex found by the soluble oxine and $Fe^{+++}$ would be as follows:

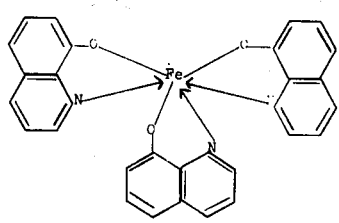

This can be represented as $FeQ_3$.

In using immobilized or insolubilized chelating agents, however, such structures would not be expected. From a steric or strain point of view it would be unreasonable to expect that a chelate like $FeQ_3$ would be formed with immobilized oxine. Rather, by considering the electronic structure of $Fe^{+++}$, a complex such as:

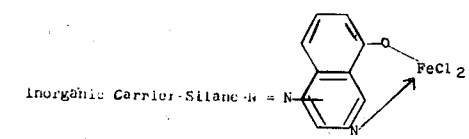

or a charged, six-coordinated complex like:

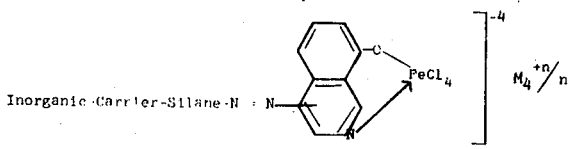

would be expected, depending on the availability of the chloride ion and a cation, M. Thus, immobilizing the chelating agent and then complexing it with a metal ion should lead to a different kind of chelate complex than that ordinarily encountered.

It should also be noted that in many cases similar a chelated compound is formed with a metal, the chelating agent (or ligand) must have a dual character. On the one hand, it must be an acid; i.e., it must have a displaceable hydrogen ion. On the other hand, it must also be a base; i.e., it must have a pair of unshared pair of electrons available for coordination. Thus, in the case where silanized inorganic carriers are used to chemically couple chelating agents, the acidity of the environment, as influenced by the silanized carrier, should affect the pH at which the metal is complexed. These pH effects may be different for inorganic carriers and organic carriers in a manner similar to that observed with the pH optima of other entities which have been chemically coupled to both organic and inorganic carriers (e.g., enzymes). The effect of pH on complexation can be readily seen in the above tables.

Experimentally, the chemically coupled 8-hydroxyquinoline (CPG-O) was evaluated the most thoroughly, and was shown above to react extensively with a variety of elements including Zr, Fe, Ti, V, Mo, W, Cu, Ni, and Co. All of these elements were extracted quantitatively from solutions at appropriate pH. Generally, the extractability increases from pH 2.0 to 7.0, our preferred pH range. Controlled pore glass-salicylaldoxime extracted copper essentially quantitatively from pH 5.0 to 7.0. Controlled pore glass-neocuproine extracts copper (I) from solutions to the extent of approximately 75% at pH 7.5.

Column studies were also completed to determine loading capacity. A column was prepared from a 10 ml. buret packed with CPG-O. A standard solution of copper (78 μg per ml.) of pH 4.0 was passed through the column until a positive test for copper was indicated in the effluent. After the copper breakthrough occurred in the effluent, the column was washed with water until the wash from the column was essentially free of copper. The copper was then eluted from the column using a dilute sulfuric acid solution of pH 1.0. The amount of copper eluted from the column, as indicated by the bathocuproine spectrophotometric procedure, showed the capacity to be approximately 1.1 mg. copper per gram of CPG-O.

The above CPG-chelate composites possess several important features which could make them quite valuable in research and industry. Firstly, the cations are separated from solution through complexation, not by chemi-sorption as in ion-exchange resins. Thus, the separations are more efficient. Secondly, there is less contamination due to degradation of an organic carrier. One natural utilization of these exchangers should lie in water analysis. They may also be used to prepare ultra-pure water for research. The composites can also be utilized for column chromotography and for selective separation of cations and their trace analysis, and the concentration of cations from extremely dilute solutions since the complexed metal may be easily eluted by appropriate pH change, the composites can be regenerated for reuse.

It is intended that the above examples of how to prepare chelate composites by chemical coupling to inorganic carriers should be construed as illustrative and not limiting. Accordingly, it is further intended that the above-described invention should be limited only by the appended claims.

We claim:

1. An insoluble composite comprising an inorganic carrier chemically coupled to a chelating agent by means of an intermediate silane coupling agent having a silicon portion and an organic portion wherein the coupling agent is attached to the carrier by means of the silicon portion and attached to the chelating agent through an azo linkage by means of the organic portion of the coupling agent, the chelating agent being selected from the group consisting of 8-hydroxyquinoline, dithizone, neocuproine, O-phenanthroline, and salicylaldoxime.

2. The composite, as claimed in claim 1, wherein the carrier is selected from the group consisting of silica, silica gels, glass, porous glass, bentonite, hydroxyapatite, alumina, and nickel oxide.

3. A method of preparing an insoluble composite comprising the steps of:
   a. silanizing an essentially insoluble inorganic carrier having surface oxide or hydroxyl groups capable of bonding to the silicon portion of the silane coupling agent with a diazotizable silane coupling agent;
   b. diazotizing the silanized carrier; and
   c. chemically coupling the diazotized silanized carrier to a chelating agent by contacting the diazotized silanized carrier with a solution of the chelating agent, the chelating agent being selected from the group consisting of 8-hydroxyquinoline, dithizone, neocuproine, O-phenanthroline, and salicylaldoxime.

4. The method, as claimed in claim 3, wherein the carrier used is selected from the group consisting of silica, silica gels, glass, porous glass, bentonite, hydroxyapatite, alumina, and nickel oxide.

* * * * *

UNITED STATES PATENT OFFICE
CERTIFICATE OF CORRECTION

PATENT NO. : 3,886,080
DATED : May 27, 1975
INVENTOR(S) : Gerald D. Schucker, Ken F. Sugawara, Howard H. Weetall It is certified that error appears in the above-identified patent and that said Letters Patent are hereby corrected as shown below:

Title Page, Inventors, "Sugarvara" should be -- Sugawara --;

"Weetoll" should be -- Weetall --.

Column 9, line 43, "similar" should be -- where --.

Signed and Sealed this fifth Day of August 1975

[SEAL]

Attest:

RUTH C. MASON
Attesting Officer

C. MARSHALL DANN
Commissioner of Patents and Trademarks